April 1, 1958 C. J. CISLO 2,829,212
STEERING WHEEL ASSEMBLY
Filed Dec. 30, 1954 2 Sheets-Sheet 1
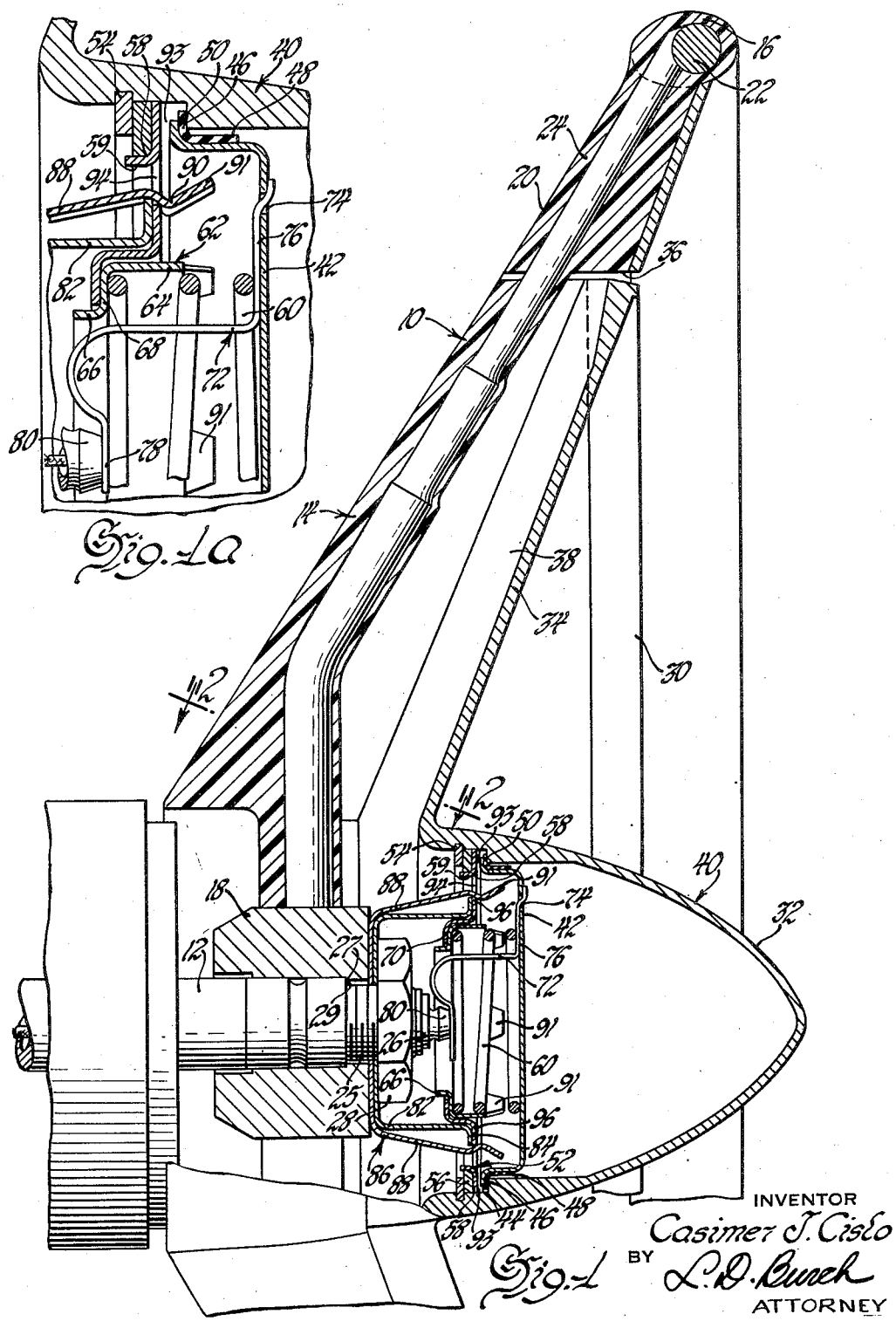
INVENTOR
Casimer J. Cislo
BY L. D. Burch
ATTORNEY

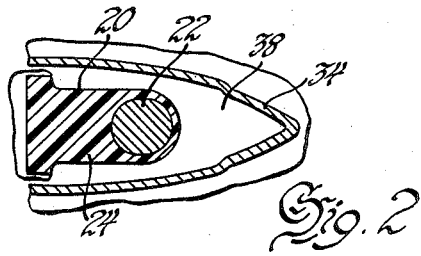
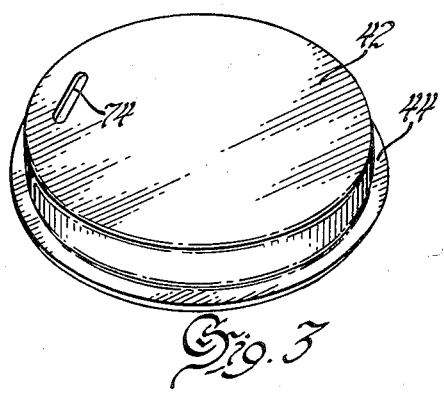
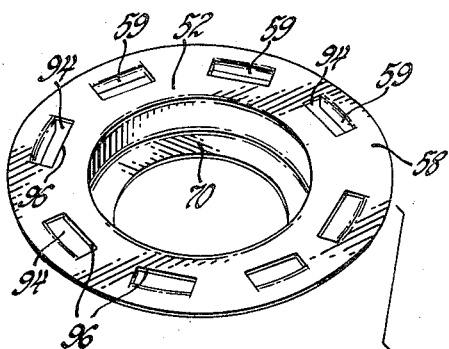
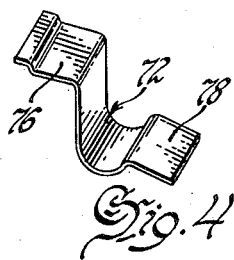
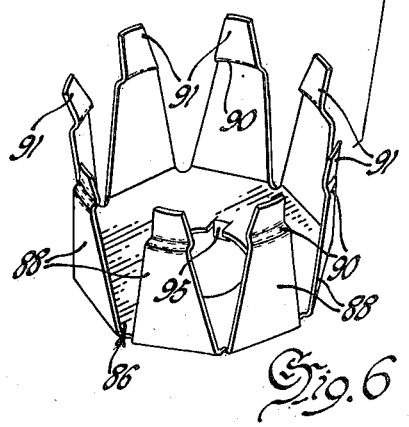
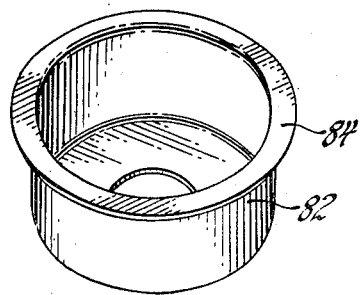

United States Patent Office 2,829,212
Patented Apr. 1, 1958

2,829,212

STEERING WHEEL ASSEMBLY

Casimer J. Cislo, Detroit, Mich., assignor to General Motors Corporation, Detroit, Mich., a corporation of Delaware Application December 30, 1954, Serial No. 478,610

8 Claims. (Cl. 200—61.56)

This invention relates to steering wheel assemblies for automobiles and the like having the usual horn ring for closing the horn circuit, and more particularly to a steering wheel assembly of this type in which the contact components of the horn circuit are retained in the hub of the horn ring sub-assembly and in which the latter may be easily secured to or removed from the steering post.

One of the objects of the invention is to provide a steering wheel assembly that is pleasing in appearance in that there is no visible means for the attachment of the horn ring sub-assembly.

Another object of the invention is to provide a steering wheel assembly that is easily assembled and disassembled merely by pushing or pulling the horn ring sub-assembly in an axial direction with respect to the steering post.

Still another object of the invention is to provide a horn ring sub-assembly in which the contact components of the horn circuit are securely retained in operating position in the hub of the horn ring. The proposed horn ring sub-assembly may be applied to or subsequently removed from the steering post without the need of special attention toward aligning parts of the switch.

A still further object of the invention is to provide a steering wheel assembly and a horn ring sub-assembly which may be easily constructed with a minimum number of simple, inexpensive parts and which may be assembled without the use of special tools.

These and other objects will become apparent by referring to the following specification and the drawings which illustrate a preferred embodiment of the invention.

In the drawings:

Figure 1 is a vertical cross-sectional view, with portions thereof in elevation, illustrating in detail a steering wheel assembly and a horn ring sub-assembly embodying the invention.

Figure 1a is an enlarged fragmentary view of a portion of Figure 1.

Figure 2 is a cross-sectional view taken on the plane of line 2—2 of Figure 1 and looking in the direction of the arrows.

Figures 3–5 are perspective views of some of the elements employed in the steering wheel assembly shown by Figure 1.

Figure 6 is an exploded perspective view illustrating parts employed in the preferred embodiment of the invention shown for snapping engagement of the horn ring sub-assembly with the steering post.

Referring to the drawings in greater detail, a steering wheel assembly 10 embodying the invention may comprise a tubular steering post 12 having attached thereto the usual steering wheel 14. The steering wheel, which commonly includes an outer wheel 16 secured to an inner hub 18 by means of the spokes 20, may comprise a metal inner structure 22 having a decorative covering 24 of some other material such as plastic. The steering wheel may be secured to the free end 26 of the steering post 12 by any suitable means such as a nut 28 engaging the threads 25, so that shoulder 27 on the hub engages shoulder 29 on the post. Any suitable device may be employed for securing the post 12 for rotation with the steering wheel.

The horn ring may itself comprise an outer ring 30 connected to the hollow inner hub 32 by means of spokes 34 which correspond in general positioning to the spokes 20 of the steering wheel 14. The spokes 20 of the steering wheel 14 may be recessed at 36 to receive the outer wheel 30 of the horn ring, and the spokes 34 of the horn ring may be made hollow to fit over or receive the corresponding portions of the spokes 20 of the steering wheel with sufficient clearance 38 so that the horn ring 30 may be depressed at any point on its periphery sufficiently to close the horn circuit as will be described later.

As stated above, one of the novel features of the invention is that the contact components of the horn circuit are securely retained in operative position in the hub of a horn ring sub-assembly. In the preferred form of horn ring sub-assembly 40 shown by Figure 1, these components include an annular movable contact member 42 having a radially extending flange 44 adapted to bear on the radially extending flange 46 of the annular insulating member 48 which may be shaped to receive the contact member 42 and which electrically insulates the contact member 42 from the hub 32. The flange 46 of the insulating member 48 bears on the annular shoulder 50 inside of the hub, and the outer diameter of the member 48 may be less than the inside diameter of the hub 32 for ease of assembly.

Spaced from the movable contact 42 is a flanged lower contact member 52 which is retained in the hub by means of a snap ring 54, with the annular cushion 56 made of any resilient material being disposed between the snap ring 54 and the radial flange 58 on the contact member. The downwardly bent tabs 59 may be employed to retain the cushion 56 in a radially outward position. The contact member 42 is normally held in spaced relation with respect to contact member 52 by means of the helical spring 60 which is insulated from the lower contact member 52 by means of the annular insulating member 62 having the portion 64 to receive the spring and the portion 66 to receive the end 26 of the steering post 12. The shoulder 68 of the member 62 bears on the shoulder 70 of the lower contact member 52.

Stated in another way, the spring 60 spreads the contact members 42 and 52, together with their respective insulating members, apart between abutments provided by the shoulder 50 and the snap ring 54. The leaf spring 72 has one end thereof inserted through the slot 74 in the annular movable contact 42, with the flat portion 76 thereof being held against the contact member 42 by the top coil of the spring 60. In this manner, the leaf spring 72 is positively located and locked in position. The other end 78 thereof is adapted for constant engagement, in the steering wheel assembly, with the terminal 80 fixed to and insulated from the free end 26 of the steering post 12.

The above relation and cooperation of parts, except for the contact between spring 72 and terminal 80, is the same before and after the horn ring sub-assembly is attached to the steering post. It is also apparent that all of the parts of the horn ring sub-assembly may be easily assembled by hand and without the use of tools of any kind.

The nut 28, in addition to securing the steering wheel hub 18 to the steering post 12, also secures the annular horn ring sub-assembly support 82 which receives a portion of the lower contact member 52 and which has a radially extending flange 84 engaging the underside of the lower contact member 52 for spacing the horn ring sub-assembly 40 in proper position in a direction along the axis of the steering post 12. The annular spring member 86 having a plurality of circumferentially spaced fingers 88 with shoulders 90 thereon is also secured by the nut 28 in a position receiving the support member 82. A tab 95 may be provided to prevent member 86 from rotating.

Before the horn ring sub-assembly 40 is attached to the steering post 12, the spring fingers 88 will be contracted radially inwardly to engage the outer edge of the radially extending flange 84 on the annular horn ring sub-assembly support 82. To assemble the horn ring sub-assembly 40 to the steering post 12 it is only necessary to position the horn ring sub-assembly 40 so that the free ends 91 of the fingers 88 enter the circumferentially spaced slots 94 in the lower contact member 52 and to push the horn ring sub-assembly 40 with sufficient force in a direction axially of the post 12 to spread the spring fingers 88 so that the shoulders 90 will engage the inner edges 96 of the slots 94 in the lower contact member 52. Any upward movement of member 52 will, of course, be limited by the spring 60 or by its contact with member 42. To remove the horn ring sub-assembly from the steering wheel post it is only necessary to pull upwardly on the same so that the edges 96 will again spread the spring fingers 88 so that they may be removed from the slots 94 in the lower contact member 52. The inward tension of the resilient spring fingers 88 may be made sufficient so that in the assembled position thereof the horn ring sub-assembly 40 may not be detached unintentionally.

The horn circuit may be provided by passing a live wire through the hollow steering post 12 and attaching it to the insulated terminal 80. This will, of course, supply current to the upper contact 42. The two contacts 42 and 52, which are normally separated by gap 93, may be connected in series by employing the steering post to which the lower contact is secured as a ground. In such a circuit, it is apparent that the horn may be operated by pushing on the horn ring 30 at any point on its periphery, since this will cause the flanges 44 and 58 to make contact and to close the horn circuit.

It is now apparent that there has been provided a steering wheel assembly in which the horn ring sub-assembly contains within the hub thereof all of the horn circuit contact or switch members. These parts are adapted to be inexpensively manufactured and easily assembled in the hub either by hand or with the use of only the simplest tools. Also, once assembled, these parts will not come out of operative relation when the horn ring assembly is removed from the steering post. In addition, the horn ring sub-assembly and the steering post have inexpensive cooperating parts hidden from view and providing convenient snap fastener means for securing the same together in a manner so that the horn ring sub-assembly may be conveniently removed and replaced when desired without the use of tools.

What is claimed is:

1. A steering wheel assembly, comprising a steering wheel secured to a steering post and a horn ring sub-assembly having a hollow hub, said hub having secured therein contact members for closing the horn circuit, one of said contact members having circumferentially disposed slots therein receiving correspondingly spaced resilient fingers associated with the end of said steering post.

2. A steering wheel assembly, comprising a steering wheel secured to a steering post and a horn ring sub-assembly including a hollow hub, said hub having secured therein contact members for closing the horn circuit, one of said contact members having spaced edges therein engaging correspondingly spaced resilient fingers associated with the end of said steering post.

3. A steering wheel assembly, comprising a steering wheel secured to a steering post and a horn ring sub-assembly including a hollow hub, said hub having secured therein a pair of contact members for closing the horn circuit and a spring resiliently urging said contact members apart, one of said contact members having means therein cooperating with resilient attaching means associated with the end of said steering post for securing said sub-assembly to said post.

4. A steering wheel assembly having a horn switch associated therewith, comprising a steering wheel secured on a steering post and a horn ring sub-assembly including a hollow hub, said post having fixed to the free end thereof horn ring sub-assembly support and securing members and a live terminal for the horn circuit, said terminal being insulated from said post and said post providing the ground for the horn circuit, said hub having therein a pair of contact members, said contact members being resiliently held in normally spaced relation against spaced abutments provided on said hub, one of said contact members having means cooperating with said horn ring sub-assembly support and securing members for supporting and securing said horn ring sub-assembly to said post, the other of said contact members having resilient means providing continuous contact with said insulated terminal.

5. A steering wheel assembly having a horn switch associated therewith, comprising a steering wheel secured on a steering post and a horn ring sub-assembly including a hollow hub, said post having fixed to the free end thereof a horn ring sub-assembly support and securing member and a live terminal for the horn circuit, said terminal being insulated from said post, said hub having therein a pair of contact members, said contact members being resiliently held in normally spaced relation against spaced abutments provided on said hub, one of said contact members having means cooperating with said horn ring sub-assembly support and securing member for supporting and securing said horn ring sub-assembly to said post, said one contact member being the stationary contact member, the other of said contact members being the movable contact member and having resilient means provided continuous contact with said insulated terminal, said horn circuit being closed by engaging said stationary contact member with said movable contact member.

6. A steering wheel assembly for automobiles and the like, comprising a steering wheel secured to the free end of a steering post and a horn ring sub-assembly for closing the automobile horn circuit, said horn ring sub-assembly including a hollow hub and a pair of spring-biased contact members for said horn circuit, said contact members being retained within said hollow hub by means of a snap ring device, one of said contact members having circumferentially spaced slots therein, the edges of said slots cooperating with spring fingers associated with said free end of said steering post for snapping engagement therewith in securing said horn ring sub-assembly to said post.

7. A horn ring sub-assembly for use with a steering wheel secured to the free end of a steering post, comprising a hollow hub and a pair of spring-biased contact members, said contact members being retained within said hollow hub by means of a snap ring device, one of said contact members having circumferentially spaced edges thereon, said edges cooperating with resilient means associated with said free end of said steering post for snapping engagement therewith in securing said horn ring sub-assembly to said post.

8. In a steering wheel assembly having a horn ring, a hollow hub associated with said horn ring, a pair of contact members disposed with said hollow hub, said contact members being spring-biased in normally spaced relation against spaced abutments provided in said hub, one of said abutments consisting of a removable snap ring type device engaged in a groove in said hub, the contact member engaging said snap ring device having edges cooperating with snap fastener means on said steering wheel for attaching said horn ring to said steering wheel.

References Cited in the file of this patent
UNITED STATES PATENTS

| | | |
|---|---|---|
| 2,193,223 | Chayne et al. | Mar. 12, 1940 |
| 2,203,281 | Hollingsworth | June 4, 1940 |
| 2,286,016 | Sladky | June 9, 1942 |
| 2,625,618 | Creson | Jan. 13, 1953 |
| 2,707,406 | Sampson | May 3, 1955 |
| 2,732,448 | Berner et al. | Jan. 24, 1956 |

FOREIGN PATENTS

| | | |
|---|---|---|
| 710,179 | Great Britain | June 9, 1954 |